United States Patent

Kadota et al.

[11] 4,040,009
[45] Aug. 2, 1977

[54] PATTERN RECOGNITION SYSTEM

[75] Inventors: Shozo Kadota; Yoshiji Fujimoto, both of Hachioji; Masao Yamamoto, Tokyo, all of Japan

[73] Assignee: Hitachi, Ltd., Japan

[21] Appl. No.: 675,972

[22] Filed: Apr. 12, 1976

[30] Foreign Application Priority Data

Apr. 11, 1975 Japan .................................. 50-43187

[51] Int. Cl.² ............................................. G06K 9/00
[52] U.S. Cl. .................... 340/146.3 AQ; 340/146.3 Q
[58] Field of Search ............. 340/146.3 AQ, 146.3 D, 340/146.3 AH, 146.3 R

[56] References Cited

U.S. PATENT DOCUMENTS

| | | | |
|---|---|---|---|
| 3,182,290 | 5/1965 | Rabinow | 340/146.3 AQ |
| 3,263,216 | 7/1966 | Andrews | 340/146.3 D |
| 3,492,646 | 1/1970 | Bene et al. | 340/146.3 D |
| 3,533,068 | 10/1970 | Hanaki et al. | 340/146.3 AH |
| 3,585,588 | 6/1971 | Hardin et al. | 340/146.3 AH |
| 3,829,831 | 8/1974 | Yamamoto et al. | 340/146.3 AQ |
| 3,967,241 | 6/1976 | Kawa | 340/146.3 D |

*Primary Examiner*—Leo H. Boudreau
*Attorney, Agent, or Firm*—Craig & Antonelli

[57] ABSTRACT

In order to recognize confusable characters exactly, a pattern recognition system is described wherein, when more than two reference patterns having a similarity to the input unknown pattern larger than a predetermined threshold level are detected by a first discriminating circuit, one or more suitable feature comparators are selected from a plurality of feature comparators by the control signals corresponding to the reference patterns or the category thereof detected by the first discriminating circuit and the selected one or more feature comparators determine the identity of the input unknown pattern by comparing selected features thereof to the corresponding portions of the plural reference patterns under consideration.

16 Claims, 11 Drawing Figures

J T  B 8
(a)    (b)

7 T  U O
(c)    (d)

| C₁ | C₂ | I₁ | I₂ | N₁ | N₂ | F₁ | F₂ | T₁ | T₂ | J |
|---|---|---|---|---|---|---|---|---|---|---|
| J | T | 1 | 1 | 4 | 4 | 1 | 0 | 0.5 | 2.0 | 1 |
| B | 8 | 2 | 1 | 4 | 4 | 1 | 0 | 1.5 | 0.5 | 1 |
| ⋮ | ⋮ |  |  |  |  |  |  |  |  |  |
| 7 | T | 3 | 2 | — | — | — | — | 3 | 5 | 2 |
| M | N | 1 | 2 | — | — | — | — | −5 | 5 | 2 |
| ⋮ | ⋮ |  |  |  |  |  |  |  |  |  |
| U | O | 1 | 1 | — | — | — | — | 5 | 2 | 3 |
| X | K | 2 | 3 | — | — | — | — | 5 | 2 | 3 |
| ⋮ | ⋮ |  |  |  |  |  |  |  |  |  |

|  | $X_1$ | $Y_1$ | $X_2$ | $Y_2$ | L | A |
|---|---|---|---|---|---|---|
| BRANCH ① | 4 | 8 | 2 | 4 | 8 | 1 |
| BRANCH ② | 4 | 8 | 6 | 8 | 2 | 9 |
| BRANCH ③ | 4 | 8 | 2 | 8 | 2 | 11 |
|  |  |  |  |  |  |  |
|  |  |  |  |  |  |  |

| LINE ELEMENT ORDER | DIRECTION NUMBER |  |
|---|---|---|
| 1 | 0 | ⎫ |
| 2 | 0 | ⎪ |
| 3 | 0 | ⎪ |
| 4 | 0 | ⎬ BRANCH ① |
| 5 | 0 | ⎪ |
| 6 | 1 | ⎪ |
| 7 | 3 | ⎪ |
| 8 | 4 | ⎭ |
| 9 | 6 | ⎫ BRANCH ② |
| 10 | 6 | ⎭ |
| 11 | 2 | ⎫ BRANCH ③ |
| 12 | 2 | ⎭ |

PATTERN RECOGNITION SYSTEM

BACKGROUND OF THE INVENTION

1. Field of the Invention

This invention relates to a pattern or character recognition system, in particular, to a pattern recognition system which compares an input unknown pattern with a plurality of prepared reference or standard patterns and recognizes the input pattern by the fact that it corresponds to the reference pattern by more than a predetermined amount.

2. Description of the Prior Art

Many kinds of character recognition systems have been developed and are presently under development. One of them is known as a pattern match system which compares an input unknown pattern with reference patterns prepared beforehand. In such a system, there are many cases wherein the system rejects an input pattern as an unrecognizable one even when the input pattern can be discriminated from similar reference patterns by the human eye.

Of course, some of such problems can be eliminated by using an extremely large scale system, but such large systems are not commercially practical due to high cost, difficulty in maintenance and the space requirements thereof.

SUMMARY OF THE INVENTION

A primary object of this invention is to provide an economical pattern or character recognition system.

Another object of this invention is to provide a pattern recognition system which can distinguish confusing patterns correctly.

To attain these objects, a pattern recognition system is provided in accordance with this invention which comprises:

a. first circuit device for determining similarities between an input unknown pattern and each of a plurality of reference patterns prepared beforehand, and for selecting one or more probable patterns having a similarity to the unknown pattern which is larger than a predetermined amount;

b. a second circuit device for discriminating whether the number of probable patterns is one pattern or a plurality of patterns;

c. a third circuit device for recognizing the character formed by an input pattern when the number of probable patterns as determined by the second circuit device is only one, and for sending the information representing the probable pattern to a following control circuit when the number of probable patterns is not less than two;

d. a control circuit generating control signals determined by the information received from the third circuit device; and e. a plurality of feature comparators each of which compares a respective feature of an input pattern with corresponding portions of the selected probable reference patterns in accordance with a method peculiar thereto when signals from the control circuit are added, for determining one of the probable patterns as a recognized pattern.

One of the most important features of this invention resides in the fact that, when an input pattern is rejected by the first circuit device, one or more feature comparators suitable for discriminating the specific categories of probable patterns are selected by the control signals which are generated from the control circuit driven by the information representing the probable patterns.

Therefore, the pattern recognition system in accordance with the invention, as a whole, is economical and can recognize an input pattern exactly. Furthermore, one or more feature comparators are selected in accordance with a peculiar category group, and each of the feature comparators has a small and simple construction, which further leads to an economical system.

The other features and objects of this invention will become more apparent by reference to the following description when taken in conjunction with the accompanying drawings.

DESCRIPTION OF THE PREFERRED EMBODIMENT

Figures 1, 2:
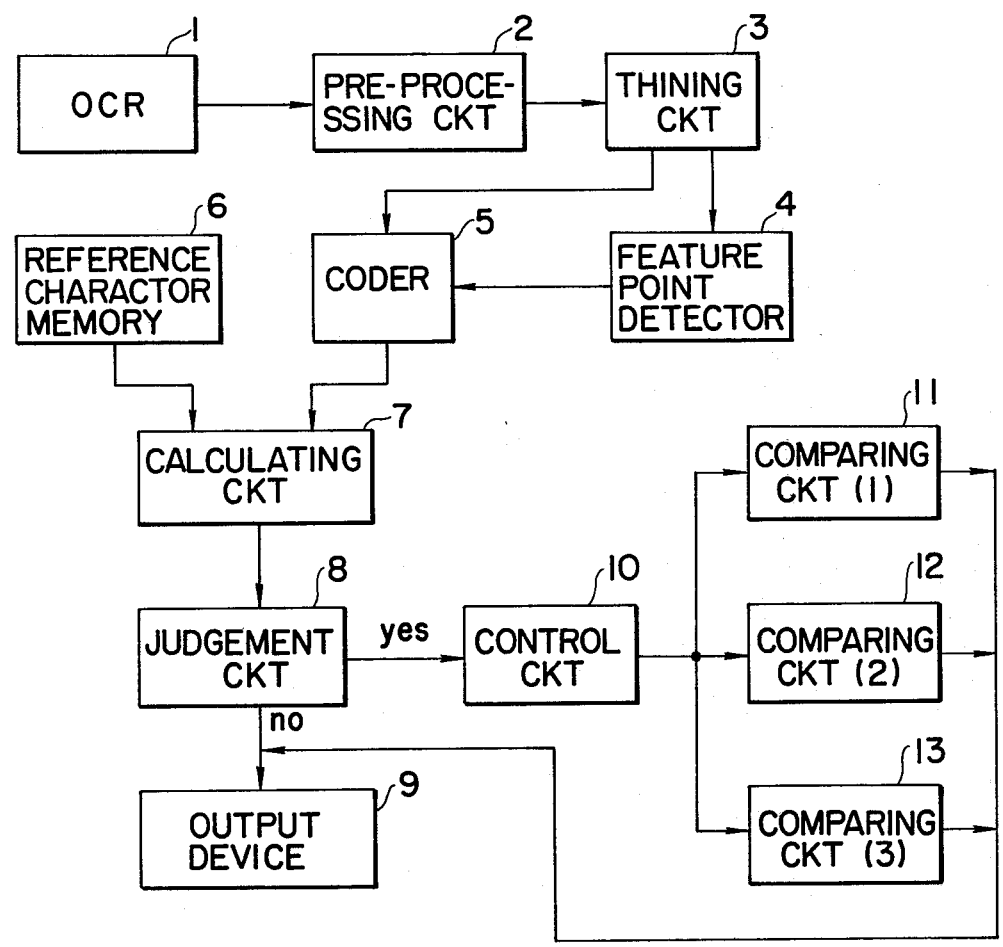
FIG. 1 is a schematic block diagram showing an embodiment of the character recognition system in accordance with this invention.
FIG. 2 shows four examples of confusable character pairs.

Referring to FIG. 1, which shows a block diagram of a character recognition system in accordance with this invention, hand and type written characters on a paper are converted into electrical signals by an opto-electrical converter 1. A preprocessing device 2 eliminates noise components and normalizes the size and the position of the characters from the electrical signals.

The normalized character information derived from the preprocessing device 2 is further converted to a line pattern having one bit width by a thining circuit 3. A feature point detecting circuit 4 detects feature points of the line pattern, such as terminal points and joint points of the branch forming the line pattern.

Figures 5B, 5C, 6:
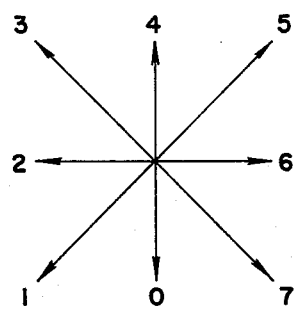
FIG. 6 shows direction code numbers.

On the other hand, a coding circuit 5 converts the line pattern into a code chain consisting of a series of direction codes of the type seen in FIG. 6. This coding circuit 5, further, produces information representing the coordinates of the terminals (a start point and an end point) of the branches and the lengths of the branches forming the line pattern as a table (referred to hereinafter as "a branch table").

A reference pattern memory stores code chains and a branch table concerning the reference characters to be compared with the input unknown character, that is, the line pattern. Those code chains and branch tables are obtained beforehand by the same method described above.

A discriminating circuit 7 compares in turn the code chain from the coding circuit 5 with each of the chains in the reference pattern memory 6 in order to determine the similarities, if any, which exist between the input unknown pattern and each reference pattern and to select the most and next most similar pattern $C_m$, $C_n$ (hereinafter referred to as "probable patterns") to the input unknown pattern. Assuming that probable patterns $C_m$ and $C_n$ have similarities $S_{mx}$ and $S_{nx}$, respectively, a judgment circuit 8 determines whether the probable pattern $C_m$ is rejected or not.

When the following relations (1) and (2) are obtained, the probable pattern $C_m$ is determined as a probable pattern input character.

$$S_{mx} \geq \epsilon_1, S_{nx} \geq \epsilon_1 \quad (1)$$
$$S_{mx} - S_{nx} \geq \epsilon_2 \quad (2)$$

and when a following relationship (3) is obtained $$S_{mx} - S_{nx} < \epsilon_2 \quad (3)$$

the input unknown pattern is rejected as an unrecognizable pattern, where $\epsilon_1$ and $\epsilon_2$ are threshold levels.

The construction and operation of elements 1 to 8 in FIG. 1 are similar to those corresponding elements used in known character recognition systems, such as the character recognition system disclosed in U.S. Pat. No. 3,609,685. However, the embodiment in accordance with this invention, as seen in FIG. 1, further comprises the second comparing circuit including elements 10 to 13.

Before describing the overall construction and operation of the system of FIG. 1, the principle of operation of the second comparing circuit formed by elements 10 through 13 will be explained for the sake of providing a clear understanding of this invention.

Most of the patterns which are rejected by the judgment circuit 8 as confusing patterns are recognizable when a feature part of the pattern comprising a character or portion thereof is compared to the reference patterns. FIG. 2 shows four examples of confusable character pairs. It is apparent that each pattern in each pair can be distinguished by examining a particular part of the pattern character. For example, the characters J and T are distinguished by judging whether the leg is bent or not; the characters B and 8 are distinguished by judging whether the lefthand side has a junction point or not; the characters 7 and T are distinguished by judging whether the length of a branch at the right upper side is long or short; and the characters o and U are distinguished by the distance between two terminal points.

A pattern recognition system in accordance with this invention is so constructed that, when the number of probable patterns, such as $C_m$ and $C_n$, rejected as confusable by the judging circuit is not less than two, one or more feature comparators are selected from a plurality of comparators by output signals of a control circuit which determine a branch or a part of the branch to be compared and methods suitable to distinguish the confusable categories by use of the information according to the probable character patterns and then each of the features of the probable character patterns are compared with the portions of the input unknown pattern by the selected comparators, and one character having a feature most similar to that of the input pattern is determined as the identified input pattern.

Now referring back to FIG. 1, a control circuit 10 operates only at the time when patterns, such as $C_m$ and $C_n$, are transmitted to the control circuit 10 as probable patterns, and determines the feature to be compared and at least one comparison method particular to the probable patterns. In response to the output signals from the control circuit 10, at least one of the feature comparators is selected from a plurality of feature comparators, such as a mean direction code comparator 11, a branch length comparator 12, a coordinate comparator 13, and so on, each of which is explained in more detail hereinafter.

Figure 3:
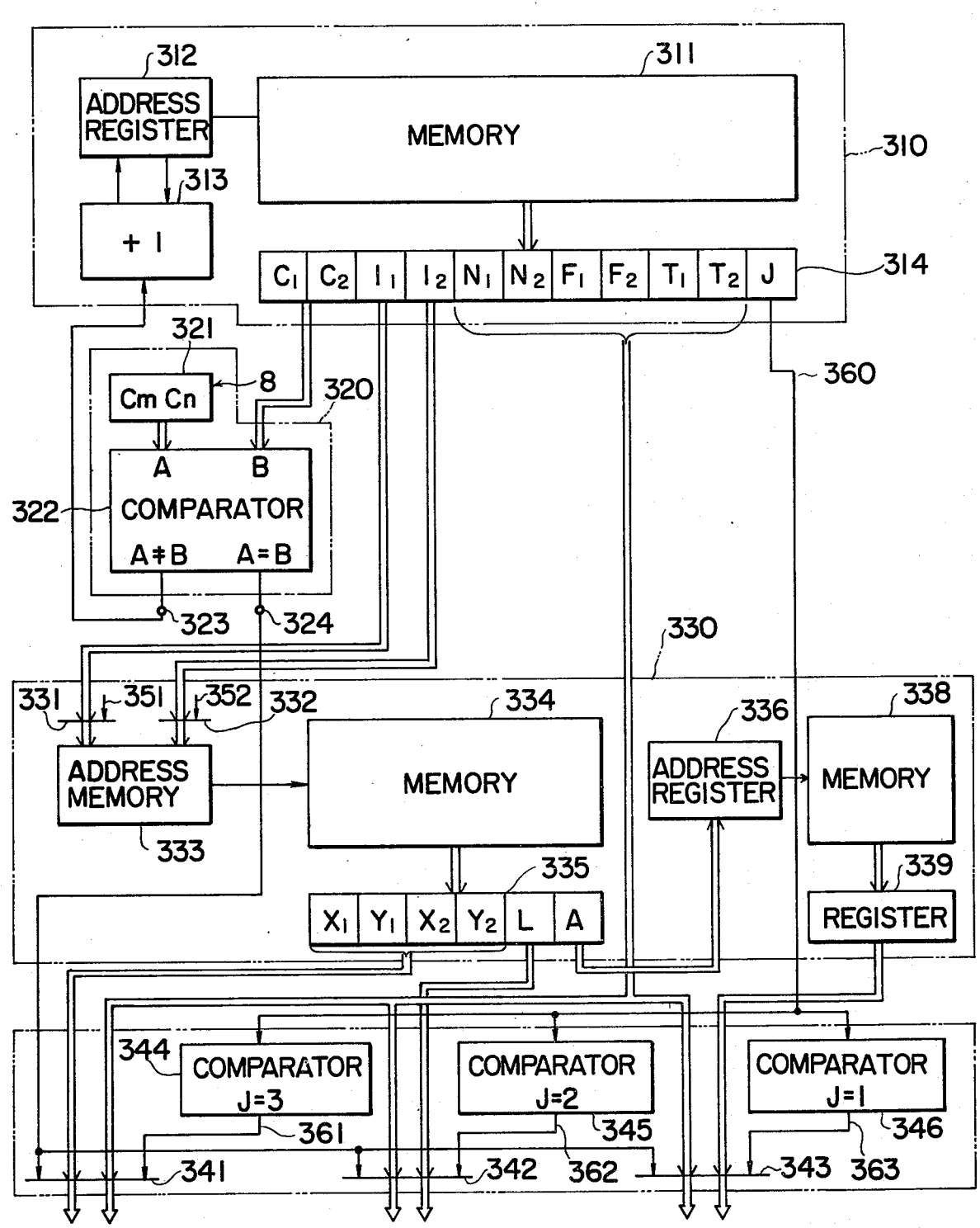
FIG. 3 is a block diagram showing the detail construction of the control circuit 10 shown in FIG. 1.

FIG. 3 shows the detail construction of the control circuit 10 shown in FIG. 1 which includes a parameter table read out member 310, a parameter pair comparing member 320, a branch table read out member 330, and an output gate member 340. The parameter table read out member 310 includes a parameter memory 311 which stores the contents of a parameter table, as shown in FIG. 4.

Figures 4, 5A:
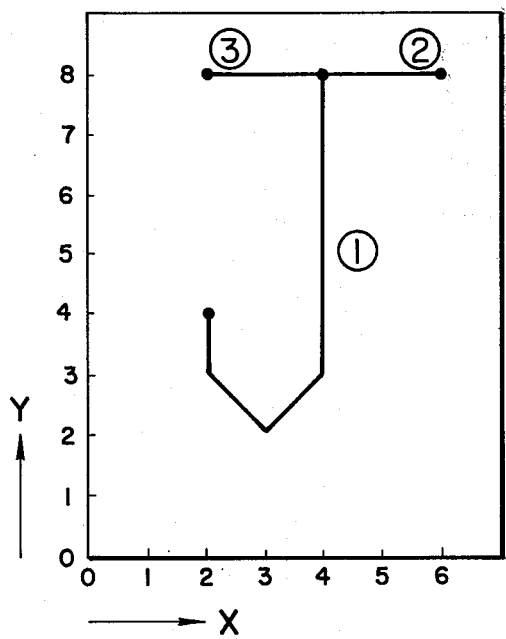
FIG. 4 is a parameter table contained in the memory 311 shown in FIG. 3.
FIGS. 5A, 5B, and 5C show respectively a line pattern, a branch table, and a code table used in the embodiment shown in FIG. 3.

In the table shown in FIG. 4, columns C1 and C2 store characters confusable with each other, such as J and T, B and 8, M and N, etc. Small numerals by the side of the characters are provided to designate each branch order or portion which makes a component part of the character. Columns I1 and I2 store the orders or portions of the branch to be examined and discriminated. Columns N1 and N2 store the code length, namely, the number of line elements to be calculated. Columns F1 and F2 store information showing whether a point of a branch is a start point or an end point (in the table 1 indicates a start point and 0 indicates an end point). Columns T1 and T2 store threshold levels. Column J stores information representing comparing methods (numerals 1, 2, and 3 in column J respectively indicate whether to use the mean direction code, the branch length, or the coordinates).

Now referring back to FIG. 3, when the judgment circuit 8 in FIG. 1 produces probable pattern signals Cm and Cn and signals representing the confusable patterns Cm and Cn are transmitted to a register 321, a comparator 322 successively compares the signals stored in the register 321 with each of the signals stored in columns C1 and C2 of memory 311 in order to determine the row or category to which patterns Cm and Cn belongs. Each time the signal representing Cm and Cn is found to not coincide with the stored signal of a row in column C1 and C2 of memory 311, a bit signal 1 is generated at terminal 323 and is applied to adder 313. Accordingly, the number stored in address register 312 is incremented by one. The output signal of the address register 312 is the address of a row in the parameter table stored in memory 311 which is transferred to memory register 314. Thus, each row in the memory 311 is scanned and read out until signals representing Cm and Cn are found to coincide with one pair of signals representing a category stored in columns C1 and C2 of memory 311.

When patterns Cm and Cn are found to coincide with one of the pairs stored in columns C1 and C2 of memory 311, a big signal 1 is generated at terminal 324 and on gate lines 351 and 352 so as to activate gates 341, 342, and 343 as well as gates 331 and 332 so that signals stored in memory register 314 corresponding to I1, I2, N1, N2, F1, F2, T1, T2, and J of one pair of characters Cm and Cn may be transferred through gates 331 and 332 to address memory 333, and to gates 341, 342, and 343 from register 314 and comparators 344, 345, and 346, as shown in FIG. 3.

In more detail, signals representing branch orders I1 and I2 are applied to address memory 333 through gates 331 and 332. The address memory reads out information concerning the branch of the input pattern to be examined from the memory 334, which stores the contents of the branch table mentioned above. The information includes such information as coordinates (X1, Y1; X2, Y2) of terminal points, the length L of the branch and pointer A of the code table memory 338 in which information of the branch to be read out is stored.

FIGS. 5A, 5B, and 5C show an example of a line pattern, a branch table and a code table of an input pattern for the character J. As shown in FIG. 5A, pattern character J consists of branches ①, ② and ③ each of which is formed of a plurality of unit line elements. Each of the line elements is coded by one of the eight direction codes shown in FIG. 6.

The branch table stored in memory 334 contains information concerning the branches of each portion of a character, which comprises the coordinates (X1, Y1) and (X2, Y2) of the terminal points, the length L of a branch and pointer A which shows the address of the memory element of the code table in which the line element to be read out first is stored as shown in FIG. 5B. Thus, the branch ① is to be read out beginning with element 1 of the line, the branch ② begins with element 9 of the line, and the branch ③ begins with element 11 of the line. FIG. 5C shows a code table in which the codes for each of the line elements forming a pattern are arranged sequentially.

Referring again to FIG. 3, the information of a branch to be compared is transferred to a register 335 from the memory 334 in accordance with the address stored in memory 333. The pointer A in the memory 335 is transferred to an address register 336, which reads out the direction codes stored in the memory element address by the pointer A. The code signal representing a line element is read out from the memory 338, which contains the code table, in accordance with pointer A and is transferred to a register 339.

On the other hand, the coordinates (X1, Y1) and (X2, Y2) in the register 335 of a branch to be compared are guided to gate 341, the length L in the register 335 of a branch to be compared is guided to gate 342 and the direction code stored in register 339 is guided to gate 343.

Comparators 344, 345, and 346 which receive the signal J through a line 360 in common representing the comparing method J stored in register 314, produce gate activating signals on lines 361, 362, and 363, respectively, when J is 1, 2, or 3. Therefore, when $J = 1$, signals representing N1, N2, F1, F2, T1, T2 and the direction codes of register 339 pass through gate 343 and are transmitted to the mean direction comparing circuit 11 shown in FIG. 1. When $J = 2$, signals representing N1, N2, F1, F2, T1, T2 and L pass through gate 342 and are added to the branch length comparator 12 shown in FIG. 1. And, when $J = 3$, signals representing X1, Y1, X2, Y2, N1, N2, F1, F2, T1, and T2 pass through gate 341 and are added to the coordinate comparator 13 shown in FIG. 1.

Figure 7:
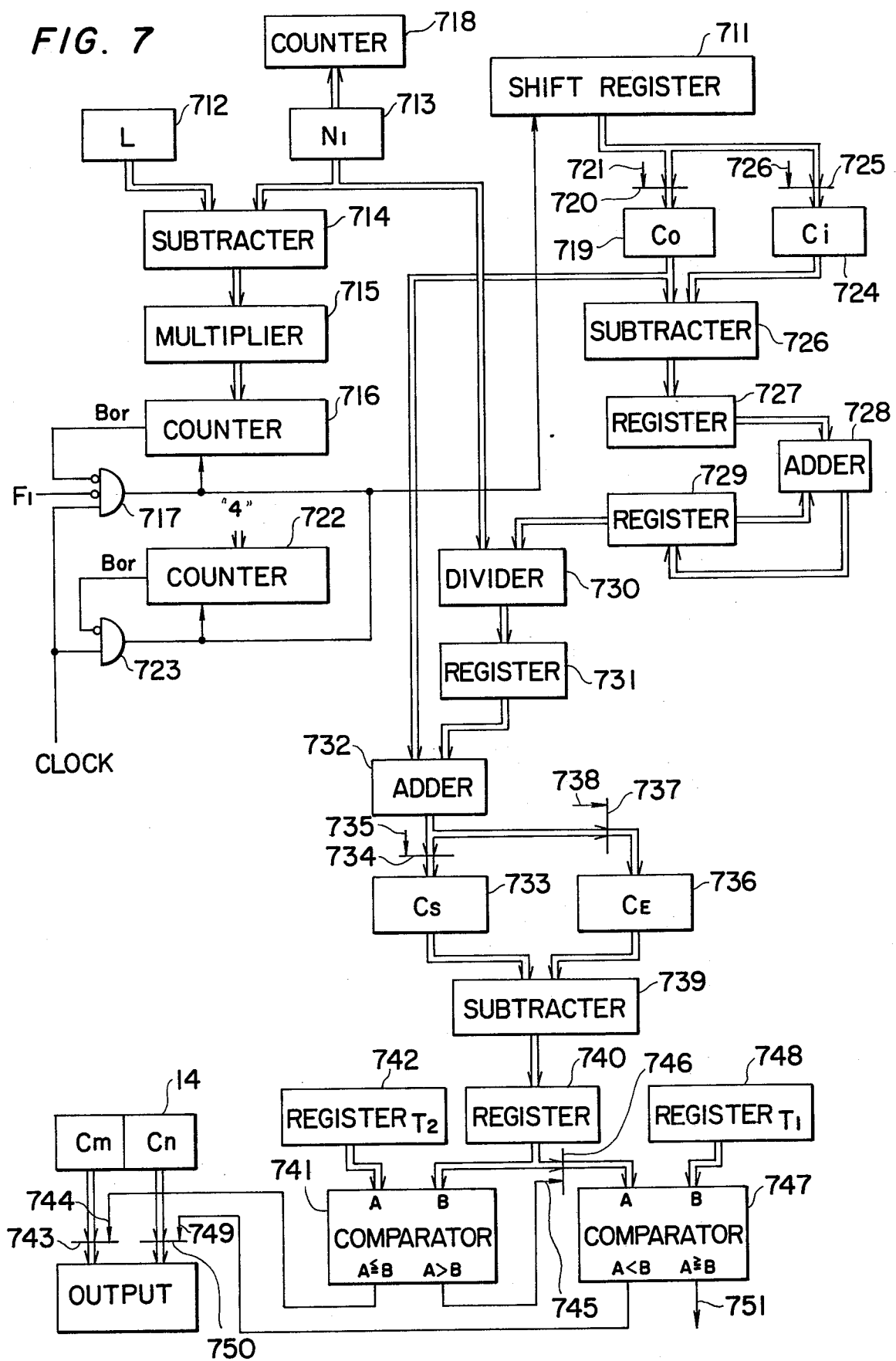
FIG. 7 is a block diagram showing an embodiment of the mean direction code comparator used in the embodiment shown in FIG. 3.

FIG. 7 shows an exemplary construction of the mean direction code comparator 11. This circuit operates in accordance with the following formula in order to obtain the mean value of the direction codes.

$$C_o + \frac{\sum_{i=1}^{N_1 - 1} (C_0 - C_i)}{N_1}$$

where Co is the first code in a plurality of codes to be calculated and Ci is the succeeding $i$'th code after Co.

The contents or codes stored in the register 339 are transferred to a shift register 711. When F1 is 1, the code signal Co is not shifted. When F1 is 0, the code signals in the shift register 711 are shifted by L-N1. In more detail, assuming that the code consists of four bits, an output signal L-N1 from subtractor 714, which subtracts the signal N1 obtained from register 713 from the signal L obtained from register 712, is multiplied by four by a multiplier 715.

The output signals from multiplier 715 are stored in a counter 716 which counts the number to be shifted. The value stored in the counter 716 is decreased by one each time a clock signal is applied thereto from the output of gate 717, and stops its operation when a borrow signal Bor is generated to block gate 717. Therefore, clock signals are applied to the shift register 711 through the logic gate 717 during the time the counter 716 is counting down, so that the code signal Co is stored at the head portion of the register 711. At that time, signal N1 is also stored in a counter 718.

The signal Co stored in the register 711 is transferred to register 719 through a gate 720 which is activated by a gate signal 721, and then, the count in the counter 716 is decreased by one and another counter 722 is set to the number four. The code signals in the register 711 are further shifted by four bits by the clock signal which is applied through gate 723 until the signal Bor is generated by the counter 722 so that the second code signal Ci may be shifted to the lead of the register 711. After that, the code signal Ci is transferred to a register 724 through a gate 725 activated by a gate signal 710. The code signal Co in register 719 and the code signal Ci in register 724 are put into a subtractor 726 which calculates the difference Co-C1. The output signal Co-C1 is transmitted to an added 728 through a register 727. The adder 728 adds the signal from the register 727 to the signal from a register 729 and transfers its output again to the register 729. This register stores a zero value at the start. When this one loop operation is completed, the counter 722 is again set by four and the next code signal C2 is stored in the shift register 711. The same operation is repeated until the counter 718 reaches zero.

When the content of the counter 718 becomes zero, a divider 730 divides the output signal of register 729, that is, $$\sum_{i=1}^{N1} (Co - Ci),$$

by the signal N1 from register 713, and transfers its result signal to a register 731. An adder 732 adds the signal Co from register 719 to the signal from the register 731 and produces an output signal representing $$Co + \frac{\sum_{i=1}^{N-1} (Co - Ci)}{N},$$

which is applied to a register 733 through a gate 743 activated by gate signal 735. After the above operation, which obtains the mean value of the direction representing the directions of N1 line elements in a branch I1, the signal representing I2 is set in the address register 333 through gate 332 activated by gate signal 352 in FIG. 3 and the mean value of the direction codes representing the directions of N2 line elements in a branch I2 is obtained by the same operation described above, and is applied to a register 736 through a gate 737 activated by a gate signal 738.

Thereafter, a substractor 739 subtracts the signal Ce in the register 736 from the signal Cs in the register 733. The output signal Cs-CE of the subtractor 739 is transferred to a comparator 741 through a register 740 and is compared with the signal T2 stored in a register 742.

When the following relationship is obtained $$C_s - C_E \geqq T2$$

the output signal 744 of the comparator 741 activates a gate 743, and the character Cm is stored through a gate 743 as a recognized character. On the other hand, when there is no detected relationship as mentioned above, the output signal 745 activates a gate 746, therefore, the signal $C_s - C_E$ is applied to another comparator 747, and is compared with the signal T1 of the register 748.

When the following relationship is obtained $$C_s - C_E \geqq T1$$

the output signal 749 of the comparator 747 activates a gate 750, and the character Cn is stored through the gate 750. When there is no detected relationship as described above, the comparator 747 produces a signal representing that this system cannot recognize the input character.

Although, in the described embodiment of a mean direction code comparator, the method which is used obtains the difference between codes of one or two branches and compares the difference with the threshold level, it is not always necessary to obtain such difference. For example, it may be useful to compare the directions of line elements at the terminal part of one or several branches. Furthermore, it may be useful to compare those of branches in excess of two.

Figure 8:
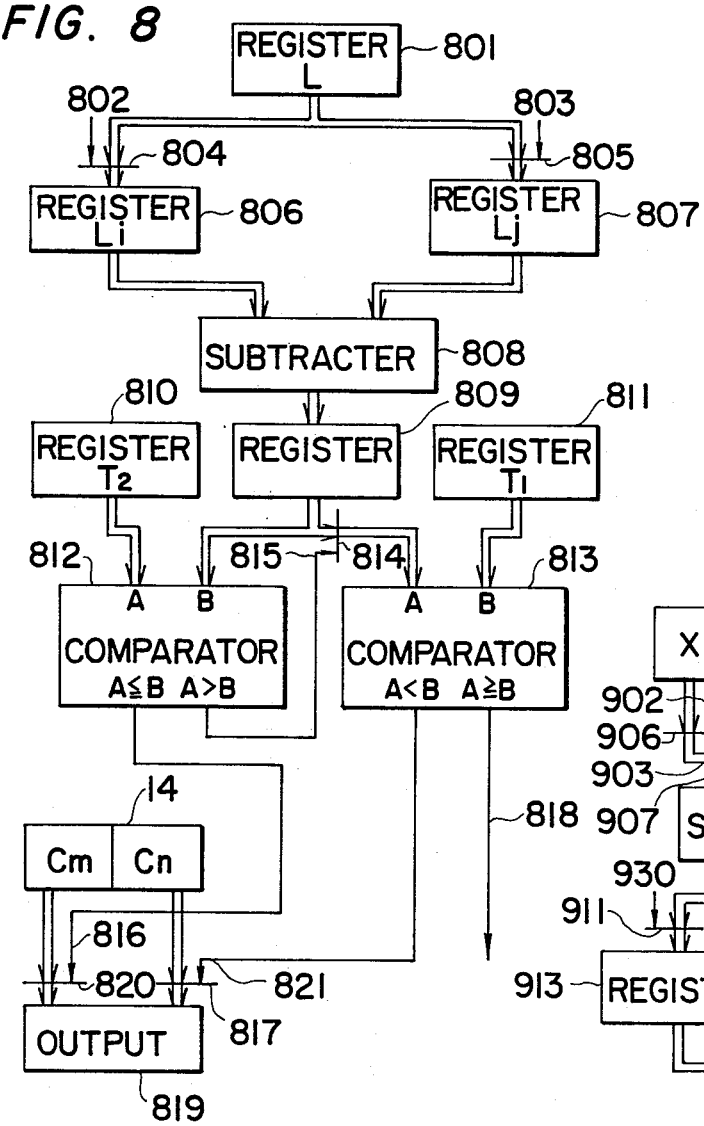
FIG. 8 is a block diagram showing an embodiment of a branch length comparator used in the embodiment shown in FIG. 3.

FIG. 8 shows the construction of the branch length comparator 12 shown in FIG. 11. In FIG. 8 a signal representing the length of the branch I1 is transferred to a register 801 from the branch table read out circuit 330 shown in FIG. 3. This signal is set in a register 806 through gate 804 activated by a gate signal on line 802. Thereafter, a signal representing the length of the branch I2 is transferred to a register 807 through a gate 805 activated by a gate signal on line 803. A subtractor 808 subtracts the signal Lj stored in the register 807 from the signal Li stored in the register 806 and transfers its output signal Li−Lj into a register 809. After that, a comparator 812 compares the signal Li−Lj from the register 809 with the signal T2 stored in a register 810.

When the following relationship is obtained $$L1 - Lj \geqq T2$$

the comparator 812 generates a gate signal on line 816 activating a gate 820, and the character Cm in the register 14 is transferred to an output register 819. On the other hand, when there is no detected relationship as mentioned above, the comparator 812 generates a gate signal on line 815 activating a gate 814. Therefore, the signal L1 − Lj in the register 809 is applied to another comparator 813 through the gate 814 activated by the gate signal on line 815. The comparator 813 compares the signal L1 − Lj with signal T1 stored in a register 811 and generates a gate signal on line 821 activating a gate 817 when signal L1 − Lj is smaller than signal T2 stored in a register 811.

Therefore, when the following relationship is obtained $$L1 - Lj < T1$$

the character Cn stored in register 14 is transferred to the output register 819 as a recognized character. And, when there is no detected relationship as mentioned above, the comparator 813 generates a signal on line 818 representing that the recognition system cannot recognize the input character.

Although, in the above embodiment concerning the branch length comparator 12, the method which is used includes comparing a difference in length between the two branches with a predetermined threshold level, it is not necessary to so limit this method. For example, it may be useful to compare the length of one branch with a threshold level or to examine the relationship between the lengths of more than three branches and to compare the ratio between two branch lengths of characters with that of two branches of an input unknown character.

Figure 9:
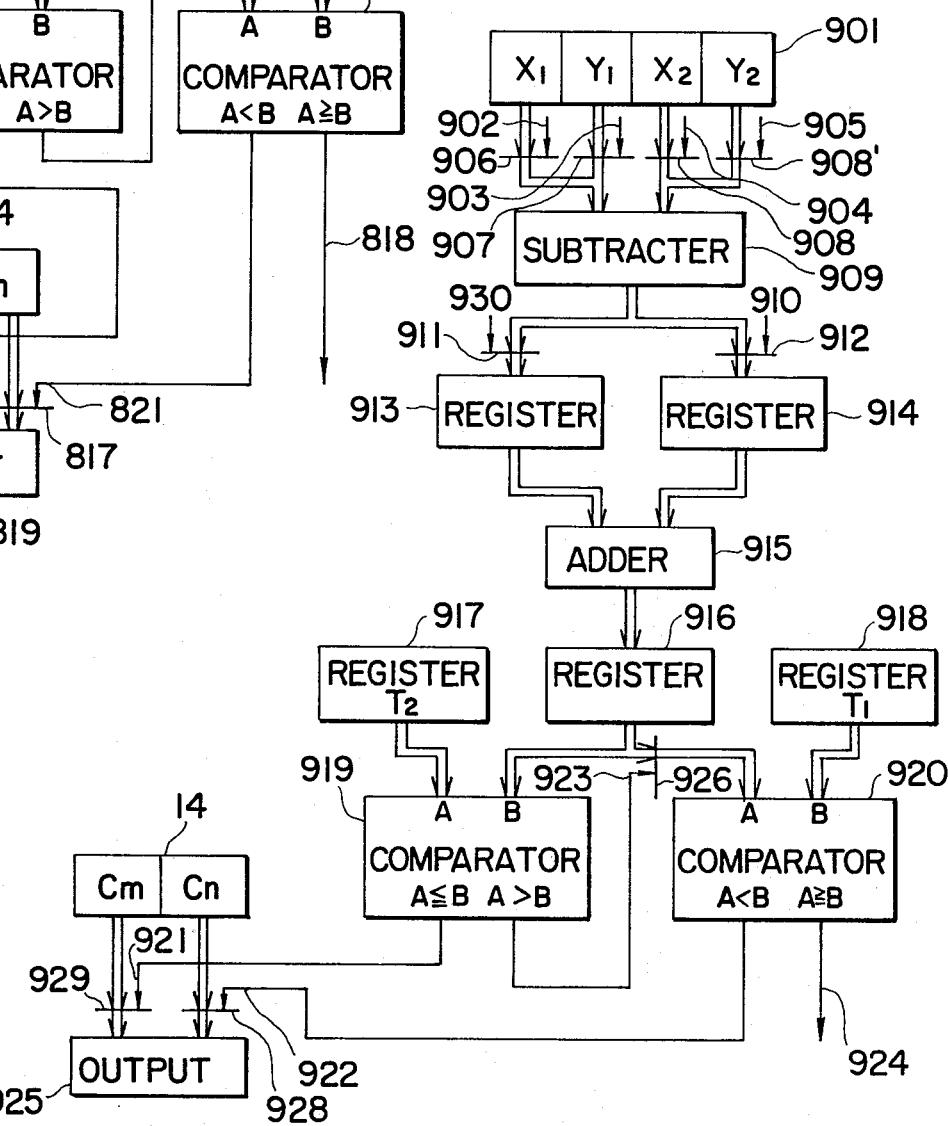
FIG. 9 is a block diagram showing an embodiment of a coordinates comparator used in the embodiment shown in FIG. 3. de

FIG. 9 shows an example of the construction of the coordinate comparator 13 shown in FIG. 3.

For simplicity of explanation, the embodiment which is shown compares a threshold level with the difference between two X coordinates of the branches. Of course, it will be apparent that one may choose either the X or Y coordinates by selecting signal lines 902, 903, 904, and 905.

In the FIG. 9 a register 901 stores signals X1, Y1, X2 and Y2, each of which is selectively applied through gates 906, 907, 908, and 909, respectively, to a subtractor 909. In order to calculate X1−X2 concerning to the branch I1, gate signals on line 902 and 904 are applied to gates 907 and 908, respectively, so that signals X1 and X2 are applied to the subtractor 909. The output X1−X2 of the subtractor 909 is applied to a register 913 through a gate 911 activated by a gate signal 930.

Thereafter, by the same operation, the X coordinates of the next branch I2 are read out from the branch table 334 shown in FIG. 3 and applied to the register 914 through a gate 912 activated by a gate signal on line 910. An adder 915 sums up the two signals X11 − X21 and X12 − X22 and transfers its output signal (X11−X21) + (X12−X22) to a register 916.

A comparator 919 compares the signal stored in the register 916 with the threshold signal T2 stored in a register 917. When the signal stored in the register 916 is not less than the threshold value stored in the register 917, that is, when $$(X11-X21) + (X12-X22) \geqq T2,$$

the comparator 919 generates a gate signal on line 921 activating a gate 929. Therefore, character Cm stored in the register 14 is transferred to an output register 929 as a recognized input character.

On the other hand, when the signal stored in the register 916 is smaller than the threshold value T2, the comparator 919 generates a gate signal on line 923 activating a gate 926. Accordingly, the signal stored in the register 916 is transferred to another comparator 920 through the gate 926 activated by the gate signal on line 923, and is compared with a signal T1 stored in a register 918.

When the signal stored in register 916 is smaller than the threshold value T1 stored in the register 918, that is, when $$(X11-X12) + (X12-X22) < T1,$$

comparator 920 generates a signal activating gate 928 on line 922. Therefore, character Cn is transferred into output register 925 as a recognized character through the gate 928. When there is no detected relationship as mentioned above, the comparator 920 produces a signal on line 924 representing that the input character is not recognized.

Although, in the embodiment concerning the coordinates comparator, there is shown the example which compares the difference between the X coordinates of both terminal points of two branches with a threshold level, it is not necessary to limit the system to use of two branches. It is possible to use the coordinates of one terminal of a branch or coordinates of more than three branches.

Furthermore, this invention is not limited to the embodiments shown above. More particularly, although in the above embodiments of this invention the mean direction code comparator, the branch length comparator and the coordinates comparator are used independently, it should be apparent that these comparators may operate in cooperation, and that other kinds of feature comparators may be used.

What is claimed is:

1. In a pattern recognition system including converting means for converting an optical input pattern into electrical signals corresponding to the characteristics of the pattern and comparing means for comparing said electrical signals to the stored electrical signals corresponding to each of a plurality of reference patterns so as to select a probable reference pattern which corresponds to the input pattern at least to a predetermined degree, a confusing pattern selection circuit for selecting one of a plurality of probable reference patterns selected by said comparing means when more than one reference pattern corresponds to said input pattern by more than said predetermined degree, comprising
feature comparator means for comparing at least one designated distinguishing portion of said input pattern to the corresponding portion of each probable reference pattern by a prescribed method of recognition including a plurality of individual feature comparators each operating in accordance with a respectively different prescribed method of recognition; and
control means responsive to stored information identifying the distinguishing portion and prescribed method of recognition of a given confusing pattern for applying the electrical signals corresponding to said input pattern and each probable reference pattern to at least one of said feature comparators selected by said control means in accordance with said stored information.

2. A pattern recognition system as defined in claim 1 wherein said control means includes first memory means for storing in selected storage locations identifying electrical signals and said stored information for each of a plurality of confusing patterns.

3. A pattern recognition system as defined in claim 2 wherein said control means further includes scanning means for scanning said first memory means to detect a storage location containing stored information relating to a confusing pattern corresponding to one of said probable patterns and read-out means responsive to said scanning means for reading out the stored information from a detected storage location.

4. A pattern recognition system as defined in claim 3 wherein said scanning means includes first address register means connected to said first memory means for addressing a storage location identified by the address thereof as stored in said first address register means, first comparator means connected to said first memory means for detecting an identity between a probable reference pattern and a confusing pattern stored in an addressed storage location, incrementing means responsive to failure of said first comparator means to detect an identity in connection with an addressed storage location for incrementing said first address register means, said read-out means being responsive to detection of an identity by said first comparator means for reading out the stored information from the storage location of said first memory means address by said first address register means.

5. A pattern recognition system as defined in claim 1 wherein said control means includes first memory means for storing in selected storage locations identifying electrical signals and said stored information for each of a plurality of confusing patterns, first address register means for sequentially scanning said storage locations, first comparator means for comparing the identifying electrical signals from each scanned storage location with the identifying electrical signals of each probable reference pattern, and read-out means responsive to detection of a correspondence by said first comparator means between a probable reference pattern and a stored confusing pattern for stopping said first address register means and reading out the stored information in the particular storage location selected by said first address register means.

6. A pattern recognition system as defined in claim 5 wherein said control means further includes second memory means for storing in respective storage locations thereof the coordinates of distinguishing portions of each of the confusing patterns stored in said first memory means and second address register means responsive to signals from said first memory means identifying the address of the storage location in said second memory means of the distinguishing portions of a confusing pattern for addressing and reading out the information in said storage location of said second memory means.

7. A pattern recognition system as defined in claim 5 wherein said control means further includes second memory means for storing in respective storage locations thereof directional code signals relating to each segmental portion of each branch of a confusing pattern and second address register means responsive to stored information from said first memory means for reading out the code signals of a selected storage location of said second memory means.

8. A pattern recognition system as defined in claim 7 wherein said control means further includes third memory means for storing in respective storage locations thereof signals identifying the coordinates of distinguishing portions of each of the confusing patterns stored in said first memory means and third address register means responsive to signals from said first memory means identifying the address of the storage location in said third memory means of the distinguishing portions of a confusing pattern for addressing and reading out the information in said storage location of said third memory means.

9. A pattern recognition system as defined in claim 8 wherein each storage location of said third memory means includes the address of the storage location in said second memory means having said code signals relating to the confusing pattern, said second address register means being connected to said third memory means to receive therefrom the address of the storage location of said second memory means which is to be read out.

10. A pattern recognition system as defined in claim 8 wherein the stored information in each storage location of said first memory means further includes code type signals identifying the respective method of recognition used by each feature comparator and information signals representing various characteristics of the distinguishing portions of each confusing pattern, said read-out means including first gate means for applying the information read out from said second memory means and said information signals from said first memory means to a first one of said feature comparators in response to a first code type signal and the output of said first comparator means.

11. A pattern recognition system as defined in claim 10 wherein said read-out means further includes second gating means for applying said information signals from said first memory means and signals indicating the length of a branch of the pattern derived from said third memory means to a second one of said feature comparators in response to a second code type signal and the output of said first comparator means.

12. A pattern recognition system as defined in claim 11 wherein said read-out means further includes third gating means for applying the coordinate signals from said third memory means and said information signals from said first memory means to a third one of said feature comparators in response to a third code type signal and the output of said first comparator means.

13. A pattern recognition system as defined in claim 12 wherein said first one of said feature comparators comprises mean code comparator means for comparing the mean of said directional code signals for each branch with the mean directional code of the corresponding portions of said input pattern.

14. A pattern recognition system as defined in claim 12 wherein said second one of said feature comparators comprises branch length comparator means for comparing the length of a branch of the input pattern with the corresponding portion of the reference pattern.

15. A pattern recognition system as defined in claim 12 wherein said third one of said feature comparators comprises coordinates comparing means for comparing the coordinates of specific points of said input pattern with corresponding points of the reference pattern.

16. A pattern recognition system as defined in claim 1 wherein said control means includes means for applying the electrical signals corresponding to said input pattern and each probable reference pattern to a selected plurality of said feature comparators.

* * * * *